United States Patent Office 3,231,329
Patented Jan. 25, 1966

3,231,329
PROCESS OF RECOVERING TUNGSTIC ACID CATALYST
Francis Weiss, Pierre-Benite, and Arsene Isard, Saint-Genis-Laval, France, assignors to Societe d'Electro-Chimie, d'Electro-Metallurgie et des Acieries Electriques d'Ugine, Paris, France
No Drawing. Filed Aug. 28, 1962, Ser. No. 220,058
Claims priority, application France, Sept. 1, 1961, 872,093
2 Claims. (Cl. 23—140)

This invention relates to a process for recovering, in a precipitated state, tungstic acid from solutions resulting from the oxidizing of organic compounds with hydrogen peroxide and containing a soluble form of tungstic acid as a catalyst.

It is known that the effect of hydrogen peroxide upon an olefinic compound in the presence of a catalyst such as tungstic acid, leads to the epoxy derivative or to the corresponding dihydroxy derivative, according to the pH of the medium. The more significant case, to which we will refer in order to describe the invention, is the case of allyl alcohol, which leads according to the hereinabove mentioned process, to glycidol or to glycerol.

Tungstic acid is insoluble in water, but is soluble in the presence of hydrogen peroxide in the state of pertungstic acid. When oxidizing organic compounds with such a solution, one observes a new precipitation of the greater part of the tungstic acid at the end of the reaction, when the hydrogen peroxide, which was the solubilizing agent, is used up. This acid can then be separated from the reaction medium by filtration or centrifuging. This operation is difficult owing to the colloidal nature of the precipitate which requires addition of coagulating agents, such as strong mineral acids or salts having polyvalent cations or anions. When the synthesis is required to be carried out at a pH higher than that of pertungstic acid, which is approximately 2, one partially neutralizes the reaction mixture with an alkaline hydroxide or with ammonia, or—which is the same thing—one uses appropriate salts of tungstic acid, such as the neutral tungstate or sodium hydrogenotungstate. This is the case, for instance, when one desires to epoxidize allyl alcohol into glycidol, either to prepare this latter or in a first step of synthesis of glycerol.

However, such pH conditions complicate the recovery of the tungstic acid catalyst. Indeed, these acid or neutral salts are soluble in the medium even when this latter does not contain hydrogen peroxide, and it has also been noted that an acidification of the medium with a strong acid, to free the usually insoluble tungstic acid, does not cause any precipitation. This may be imputed to the fact that a complex soluble acid is formed, many examples of which are described in the literature.

On the other hand, it has already been proposed to treat reaction solutions with ion exchange resins in order to fix the tungstate anion on the resin. But this process is complicated: it compels one to operate deliberately in an alkaline medium, which requires a further neutralizing of the reaction solution. Moreover, one must elute the resin charged with tungstic acid with an alkaline solution, which only gives poor results, or with a sodium chloride solution, and the tungstic acid can be recovered by precipitation only after an acidification of these solutions.

This invention allows one to avoid these drawbacks. It concerns a process for recovering, in a precipitated state, tungstic acid from a reaction mixture, resulting from the oxidizing of an olefinic compound with hydrogen peroxide, which contains it as a catalyst, the process consisting in bringing the said mixture into contact with a cation exchange resin in its acid form, then in heating this mixture to cause the precipitation of tungstic acid and in separating this latter.

Indeed, the applicants found that, contrary to the acidification of the medium with a strong acid, the acidification by cation exchange on a cationic exchange resin used in its acid form, followed by a moderate heating causes the precipitation of the tungstic acid in agglomerates of a size large enough to be recoverable in a filterable form with an excellent output and directly reutilizable for new catalytic operations.

The cationic resins utilizable in the process according to the invention include products of very different structures, such as the resins obtained by sulphonating styrene and divinylbenzene copolymers or by sulphonating condensation products of the formaldehyde with phenolic derivatives, or by sulphonating copolymers of styrene and methacrylic derivatives. These resins are known to be strongly acidic, owing to the presence of the sulfonic acid group. They have a great affinity for all cations other than the hydrogen ion, thus when contacting the acidic form of a resin with a solution of a salt, the cations are exchanged and the solution becomes acidic. The degree of reticulation of the copolymers, as well as the size of the particles may vary widely, but these factors are not important in the process. These products are easily found in trade and among them there may be mentioned the resin sold by Dow Chemical Corp. under the trademark "DOWEX 50 W–X–8" and the resin sold by Rohm & Haas under the trademark "AMBERLITE–IR 120." "DOWEX 50 W–X–8" is a sulphonated copolymer of styrene and divinylbenzene, containing eight percent of divinylbenzene.

"AMBERLITE–IR 120" is a sulphonated phenol-resorcinol cation exchange resin.

These examples of resins are non limitative; any other types of strongly acidic ion exchange resins are useful in the process.

The working conditions of the ion exchange are not critical. The temperature may vary from the ambient temperature to 100° C. The contact time and the manner in which the contact is carried out may vary. Practically, the preferred temperatures are those which the solutions to be treated normally have, and their heating or their cooling are not necessary. The speed of alkaline cation exchange is very rapid and requires only a few minutes of contact. Practically, if one proceeds according to the usual way of ion exchange, i.e., by passing the solution through a fixed bed of resin—the time of contact, which depends on the comparative volume of the bed employed, is chosen according to the desired working time between two regeneration operations of the resin. This time is easy to determine as the exchange capacity of the resin and the concentration of solutions to be treated are known.

The time of heating of the solution, after passing over the resin, varies with the temperature, from 30 to 90 minutes at 50° C. to some minutes at 100° C. One also may heat under pressure for instance during 2–10 minutes at 150–180° C. In any case, the process is particularly well adapted to a continuous working.

The process according to the invention presents numerous advantages in comparison with the known process based on the use of anionic resins.

It does not require any previous or subsequent conditioning of the reaction mixture since, after passing over the resin to eliminate the cation and heating for the precipitation of the tungstic acid, no mineral substance remains in the solution, except a small quantity of dissolved tungstic acid which, if desired, may be recovered by known means, for instance by adsorption on activated alumina. When the resin has reached its saturation with alkaline ions, its regeneration is also made by well known means, for instance by washing with hydrochloric acid, and the solutions resulting from this regeneration may be discarded without further treatment.

In the case of the synthesis of glycerin, the acidifying treatment of the reaction medium with a cationic exchange resin, according to the invention, carried out when the reaction has reached the glycidol stage, leaves this medium in acid pH conditions which are propitious to a quick hydrolysis of glycidol into glycerol, owing to the fact that the precipitation of tungstic acid is deferred. The result is that this hydrolysis takes place quantitatively during the heating carried out to precipitate the tungstic acid.

The following non-limitative examples illustrate the invention.

*Example 1*

To an aqueous solution of allyl alcohol, tungstic acid and caustic soda, a dilute aqueous solution of hydrogen peroxide was added so that the quantities of the reagents used were as follows:

| | Moles |
|---|---|
| Allyl alcohol | 2 |
| Hydrogen peroxide | 1.5 |
| $H_2WO_4$ | 0.02 |
| NaOH | 0.02 |
| Water | 50 |

The mixture was heated for 3 hours at 40°, then the solution was rectified to remove the excess of allyl alcohol. Then the solution was passed through a bed of cationic exchange resin DOWEX 50, in its acid form, at 50° C., the contact time being 15 minutes. The thus acidified solution was then heated at 100° for half an hour. The tungstic acid precipitated; it was collected by filtering. The obtained product corresponded to 82.7% of the initial tungstic acid. After separating the tungstic acid and concentrating the solution, the glycerol was collected by distillation; the obtained quantity corresponded to 84.5% of the theoretical quantity with regard to the hydrogen peroxide used.

*Example 2*

To an aqueous solution of allyl alcohol and sodium tungstate, a dilute aqueous solution of hydrogen peroxide was added so that the quantities of reagents used were as follows:

| | Moles |
|---|---|
| Allyl alcohol | 1.5 |
| Hydrogen peroxide | 1 |
| $Na_2WO_4, 2H_2O$ | 0.02 |
| Water | 50 |

The reaction mixture was heated as in Example 1. When the hydrogen peroxide was entirely consumed, the excess of alcohol was removed, then the remaining reaction mixture was divided into two fractions. The first fraction was passed through a cationic exchange resin bed of AMBERLITE–IR 120, in its acid form, at 80° C., the contact time being 5 minutes; after heating the resulting solution at 100° C., for 1 hour under reflux, the precipitated tungstic acid was collected: this latter was 89.3% of the initial tungstic catalyst. As a comparison, the second fraction of the reaction mixture was acidified by adding hydrochloric acid at the rate of 2 moles of HCl for 1 mole of initial $Na_2WO_4 \cdot 2H_2O$. The mixture was heated at 100° C. under reflux, for 3 hours without a precipitate appearing.

*Example 3*

To an aqueous solution of allyl alcohol and ammonium paratungstate a dilute aqueous solution of hydrogen peroxide was added, so that the quantities of reagents used were as follows:

| | Moles |
|---|---|
| Allyl alcohol | 3 |
| Hydrogen peroxide | 2 |
| Ammonium paratungstate | 0.003 |
| Water | 50 |

The reaction mixture was heated as in Example 1. After the hydrogen peroxide was used up and the excess of alcohol had been separated, the reaction mixture was passed through a cationic exchange resin bed of DOWEX 50 W–X–8, in its acid form, at 30° C., the contact time being 20 minutes. The mixture was then continuously discharged by means of a pump through a coil heated at 160° C., under 6 kg./cm.$^2$ pressure; the time it stayed in the coil was 10 minutes.

The precipitated tungstic acid, separated by filtration, was 77% of the initial tungstic catalyst.

We claim:
1. A process for recovering in a precipitated state, tungstic acid from a reaction mixture resulting from oxidizing an olefinic compound with hydrogen peroxide in the presence of tungstic acid in an alkaline medium as a catalyst, which process comprises bringing said reaction mixture at a temperature between substantially about ambient and 100° C. into contact with a strongly acidic polymeric cation exchange resin in its acid form to eliminate the alkaline cation and acidify the mixture, thereafter heating said mixture at a temperature higher than said first mentioned temperature to effect precipitation of tungstic acid and separating the precipitate.

2. A process according to claim 1, wherein the olefinic compound which is oxidized with hydrogen peroxide is allyl alcohol.

References Cited by the Examiner

UNITED STATES PATENTS

| 2,801,152 | 7/1957 | Kasey | 23—140 X |
| 2,869,986 | 1/1959 | Anderson et al. | 23—140 |

FOREIGN PATENTS

| 599,240 | 6/1960 | Canada. |
| 602,129 | 7/1960 | Canada. |

MAURICE A. BRINDISI, *Primary Examiner.*